United States Patent [19]

Matsuda et al.

[11] 4,012,349
[45] Mar. 15, 1977

[54] PROCESS FOR PREPARING NON-IONIC POLYURETHANE EMULSIONS

[75] Inventors: Kazuo Matsuda; Hidemasa Ohmura; Hirakazu Aritaki, all of Wakayama, Japan

[73] Assignee: Kao Soap Co., Ltd., Tokyo, Japan

[22] Filed: Jan. 12, 1976

[21] Appl. No.: 648,361

Related U.S. Application Data

[62] Division of Ser. No. 527,247, Nov. 26, 1974, Pat. No. 3,951,897.

[30] Foreign Application Priority Data

Nov. 27, 1973 Japan ............................ 48-133215

[52] U.S. Cl. ............... 260/29.2 TN; 260/77.5 AM
[51] Int. Cl.² ..................... C08G 18/32; C08J 3/06
[58] Field of Search ............................ 260/29.2 TN

[56] References Cited

UNITED STATES PATENTS

| | | | |
|---|---|---|---|
| 3,826,768 | 7/1974 | Suzuki et al. | 260/29.2 TN |
| 3,903,031 | 9/1975 | Matsuda et al. | 260/29.2 TN |
| 3,903,032 | 9/1975 | Matsuda et al. | 260/29.2 TN |

*Primary Examiner*—J. Ziegler
*Attorney, Agent, or Firm*—Woodhams, Blanchard and Flynn

[57] ABSTRACT

A process for preparing non-ionic polyurethane emulsions comprising chain-extending (A) an isocyanate-terminated urethane prepolymer (formed by reaction of a polyhydroxyl reactant having a molecular weight of 200 to 10,000 and a stoichiometric excess of a polyisocyanate), with (B) a polyalkylene polyamine as chain extending compound, thereby to form a polyurethane-urea polyamine product, mixing the said polyamine product with water or reacting the product with a cyclic dicarboxylic acid anhydride and then mixing the reaction product with water; said process being characterized in that a water-soluble polyoxyethylene glycol comprises 15 to 80% by weight of the polyhydroxyl reactant, and the said polyalkylene polyamine used as the chain-extending compound has at least two primary or secondary amino groups and a functional group having the formula $-CH(OH)-CH_2X$ in which X is Cl or Br.

10 Claims, No Drawings

PROCESS FOR PREPARING NON-IONIC POLYURETHANE EMULSIONS

This is a division, of application Ser. No. 527,247, filed Nov. 26, 1974, now U.S. Pat. No. 3,951,897.

BACKGROUND OF THE INVENTION

1. Field of the Invention

This invention relates to a process for preparing polyurethane emulsions. More particularly, this invention relates to a process for preparing homogeneous, stable, nonionic, self-emulsifiable polyurethane emulsions.

2. Description of the Prior Art

Various processes for preparing polyurethane emulsions are known. For example, an emulsifier-free polyurethane emulsion, namely, a so-called self-emulsifiable polyurethane emulsion can be prepared according to a known process comprising forming an isocyanate-terminated urethane prepolymer from a water-soluble polyhydroxyl compound and an organic polyisocyanate employed in an amount in excess of the stoichiometric amount, chain-extending the thus-formed urethane prepolymer with an active hydrogen atom-containing low-molecular-weight chain extender and dispersing the resulting polyurethane composition in water. However, the water resistance of a polyurethane resin prepared from the thus-obtained polyurethane emulsion is very low.

According to another known process, a polyurethane emulsion is prepared by dispersing a polyurethane composition in the presence of an emulsifier.

In general, polyurethane resins have excellent physical and chemical properties. However, the physical and chemical properties of a polyurethane resin film formed from a polyurethane emulsion prepared according to known conventional processes, such as those mentioned above, are greatly inferior to those of a film formed of a cross-linked polyurethane resin, because it is difficult to introduce cross-linkages in emulsion-type polyurethane resins by chemical means or because the emulsifier remains in the polyurethane resin. This is a serious problem in the field of practical use of polyurethane emulsions.

If a polymer such as polyurethane has strong cross-linkages, the polymer is infusible and insoluble, and handling thereof is difficult or often impossible during the preparation step, and therefore, it is substantially impossible to prepare an emulsion of a cross-linked polyurethane by dispersing it in water. If such a polyurethane can be dispersed in water, the resulting polyurethane emulsion is generally quite unstable.

To improve the water resistance of a polyurethane resin, there has also been proposed a process in which a part of a water-soluble polyhydroxyl compound to be used for the preparation of a polyurethane emulsion is replaced by a water-insoluble polyhydroxyl compound. According to this process, however, it is difficult to introduce strong cross-linkages into the polyurethane resin of a polyurethane emulsion, and the physical and chemical properties of the resulting polyurethane resin are not satisfactory from the practical viewpoint.

As one effective means for imparting a cross-linking property to a polyurethane resin, there is known a process comprising reacting epichlorohydrin to the amino groups of a polyurethane-urea polyamine obtained by chain-extending a urethane prepolymer with a polyalkylene polyamine. However, since the reaction occurs in a polymer system the percentage of addition of epichlorohydrin is very low and it is impossible to impart a sufficient cross-linking property to a polyurethane resin by this known process.

SUMMARY OF THE INVENTION

We have succeeded in preparing non-ionic self-emulsifiable polyurethane emulsions having functional groups capable of forming cross-linkages.

More particularly, we have discovered that the halohydrin structure is effective as a reactive functional group capable of forming cross-linkages by heat treatment of a polyurethane resin, and that in order to introduce the halohydrin structure in a desired amount into a urethane polymer, it is advantageous to use a polyalkylene polyamine having a group represented by the formula $-CH(OH)-CH_2X$ in which X is Cl or Br, as a substance for chain-extending a urethane prepolymer.

More specifically, one feature of this invention resides in that a non-ionic self-emulsifiable polyurethane emulsion can be prepared by chain-extending (A) an isocyanate-terminated urethane prepolymer (obtained by a reaction of a polyhydroxyl reactant with a stoichiometric excess of a polyisocyanate compound), with (B) a polyalkylene polyamine having a functional group represented by the formula $-CH(OH)-CH_2X$ in which X is Cl or Br, thereby to form a polyurethane-urea polyamine, and mixing that product with water or reacting that product with a cyclic dicarboxylic acid anhydride and then mixing the latter reaction product with water. The thus-obtained polyurethane emulsion is characterized by the following special properties: the resin in the polyurethane emulsion has no cross-linkages or it has a very small number of cross-linkages. It is cross-linkable, nevertheless because of its unique structure, and when a polyurethane resin film formed by drying the thus-obtained polyurethane emulsion is subjected to heat treatment, strong cross-linkages are formed in the resin film, and the physical and chemical properties of the polyurethane resin are highly improved.

Another important and distinctive feature of this invention resides in that the starting polyhydroxyl reactant is a mixture of (1) water-soluble polyoxyethylene glycol and (2) a water-insoluble polyhydroxyl compound. Further, in this invention it is critical that the proportion of water-soluble polyoxyethylene glycol (1) should be from 15 to 80% by weight, based on the total weight of the polyhydroxyl reactant mixture (the sum of (1) plus (2)).

When the content of the water-soluble polyoxyethylene glycol (1) is higher than 80 wt. %. a polyurethane emulsion containing a large amount of such water-soluble compound is obtained and the water resistance of a resin prepared from such polyurethane emulsion is inferior.

When the content of the polyoxyethylene glycol (1) is lower than 15 wt. % of the total polyhydroxyl reactant mixture, a self-emulsifiable polyurethane emulsion can be obtained only when the molecular weight of the polyurethane resin is drastically lowered, and the physical and chemical properties of a polyurethane resin prepared from such emulsion are inferior, and the resin has limited practical use.

We have discovered that when the polyoxyethylene glycol component (1) is 15 to 80% by weight of the entire polyhydroxyl reactant mixture, a polyurethane emulsion having a superior stability can be obtained and a polyurethane resin prepared, from this emulsion has superior properties.

The polyalkylene polyamine used in this invention as chain extender has a functional group represented by the formula —CH(OH)—CH₂X in which X is Cl or Br. It is a reaction product between a polyalkylene polyamine and an epihalohydrin such as epichlorohydrin and epibromohydrin, and it has the following formula:

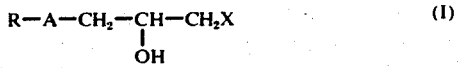

wherein X is Cl or Br, A is a secondary or tertiary amino group and R is an alkylene group having at least one primary or secondary amino group, with the proviso that the compound represented by the formula (I) has at least two primary or secondary amino groups.

Accordingly, a polyurethane-urea polyamine formed by chain-extending a urethane prepolymer with a chain extender represented by the formula (I) contains in the molecule a halohydrin structure. When a film made from the emulsion is heated, tough cross-linkages are formed by virtue of this halohydrin structure.

The polyurethane-urea polyamine used for preparation of the composition of this invention can be obtained by reacting (A) an isocyanate-terminated urethane prepolymer (formed by reaction of a polyhydroxyl reactant with an excess of a polyfunctional isocyanate), with (B) a chain extender of the formula (I), preferably in a ketone type solvent.

As the polyfunctional isocyanate (i.e. the polyisocyanate), there can be employed aromatic, aliphatic and alicyclic organic diisocyanates such as 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzylisocyanate, 1,3-phenylene diisocyanate, 1,4-phenylene diisocyanate, toluylene diisocyanate, chlorinated polyfunctional isocyanates, brominated polyfunctional isocyanates, phosphorus-containing polyfunctional isocyanates, 1,4-butylene diisocyanates, 1,6-hexamethylnee diisocyanate, lysine diisocyanate, dicyclohexylmethane diisocyanate, cyclohexane-1,4-diisocyanate and xylene diisocyanate. In addition, it is possible to use, in combination with these diisocyanates, triisocyanates such as 1-methylbenzol-2,4,6-triisocyanate, biphenyl-2,4,4'-triisocyanate and triphenylmethane triisocyanate.

Both the polyhydroxyl compound (2) and the polyoxyethylene glycol (1) have a molecular weight of 200 to 10,000.

Any of the known water-insoluble polyhydroxyl compounds (2) customarily used for preparation of polyurethanes, such as polyethers, polyesters, polyester amides, polyacetals, polythioethers and polybutadiene glycols can be used in this invention as the polyhydroxyl compound (2).

As the polyethers, there can be used, for example, ring opening polymerization products or copolymers of cyclic ethers such as propylene oxide, butylene oxide and tetrahydrofuran. Further, homogeneous or mixed polyethers formed by condensation of hexanediol, methylhexanediol, heptanediol, octanediol and the like can be used. Still further, it is possible to use propoxylated and ethoxylated glycols.

As typical examples of the polyesters, there can be used polyester glycols obtained by dehydrogenating condensation of dibasic acids with saturated or unsaturated low-molecular-weight glycols such as ethylene glycol, propylene glycol, 1,3-butanediol, 1,4-butanediol, neopentylglycol, pentanediol, hexanediol, octanediol, 2-ethyl-1,3-hexanediol, 1,4-butylenediol, bisphenol A, diethylene glycol and dipropylene glycol, and polyester glycols formed by ring opening polymerization of cyclic ester compounds.

As the polythioether, a condensation product of thioglycol alone or thioglycol with another glycol is preferably employed.

As the polyacetal, there can be used, for example, water-insoluble polyacetals prepared from hexanediol and formaldehyde or from 4,4'-dihydroxyethoxydiphenylmethane and formaldehyde.

Thus, in this invention, polyoxyethylene glycol (1), which is hydrophilic compound, is used in admixture with a hydrophobic polyhydroxyl compound (2) such as mentioned above. It is important that the polyoxyethylene glycol (1) should be 15 to 80% by weight, based on the total weight of the polyhydroxyl reactant mixture (the sum of (1) and (2)). In this invention, if desired, it is possible to use, in combination with the above polyhydroxyl reactant mixture, glycols customarily used in this field, such as ethylene glycol, diethylene glycol, triethylene glycol, butanediol, propanediol, 1,5-hexanediol, neopentyl glycol and N-alkyldiethanol amines having 1 to 22 carbon atoms in the alkyl moiety. The amount used of these optional glycols and N-alkyldiethanol amines can be up to 100 percent by weight, based on the sum of (1) plus (2).

As the polyalkylene polyamine to be used as reactant with the epihalohydrin for formation of the chain extender represented by the above general formula (I), there can be employed various polyalkylene polyamines including polyethylene polyamines, polypropylene polyamines and polybutylene polyamines.

More particularly, the polyalkylene polyamines to be used in this invention are polyamines in which the nitrogen atoms are connected by —(CH₂)ₙ— groups in which n is an integer of 1 or greater, preferably from 2 to 6, especially 2 or 3, and the number of such groups contained in the molecule is 2 to about 4. The nitrogen atoms can be bonded to adjacent carbon atoms in the group —(CH₂)ₙ—, but they cannot be bonded to the same carbon atom.

The polyamines have the formula

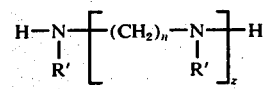

wherein n is one or more, preferably 2 to 6, Z is an integer from 2 to 4, and R', which can be the same or different, are hydrogen, alkyl having 1 to 4 carbon atoms or hydroxyalkyl having 1 to 4 carbon atoms.

More specifically, there can be used in this invention not only polyamines such as diethylene triamine, triethylene tetramine, tetraethylene pentamine and dipropylene triamine, but also mixtures of these polyamines as well as crude polyamine products.

Further, it is possible to use hydroxyalkyl-substituted polyamines in combination with the foregoing polyamines.

In some cases, in order to improve the properties of the films formed from the polyurethane emulsion prepared according to this invention, it is preferred to increase the distance between the amino groups in the molecule of the polyurethaneurea polyamine. This can be attained by replacing up to 50 wt. percent of the polyalkylene polyamine by ethylene diamine, propylene diamine, hexamethylene diamine, piperazine or phenylene diamine, or a substitution product of such diamine with an alkyl group having 1 to 22 carbon atoms or an alkylene oxide adduct, acrylonitrile adduct or acrylic acid ester adduct of such diamine.

Epichlorohydrin and epibromohydrin are effective as the epihalohydrin to be used for formation of the chain extender (I) by reaction with the above-mentioned polyalkylene polyamine, but the former is generally preferred. The polyalkylene polyamine to be used is selected so that the resulting chain extender (I) contains in the molecule at least two amino groups and at least two of these amino groups contained in the chain extender (I) are primary or secondary amino groups. When a chain extender (I) is prepared by reacting the polyalkylene polyamine with the epihalohydrin, it is preferred that the reaction be conducted in the presence of an inert organic solvent, such as benzene.

In the reaction between the polyalkylene polyamine and epihalohydrin, the ratio of both the reactants can vary depending on the number of amino groups contained in one molecule of the polyalkylene polyamine, but this ratio should be chosen so that at least two primary or secondary amino groups are contained in one molecule of the reaction product of the formula (I).

The reaction is generally conducted at a temperature of 10° to 80° C. When the reaction is carried out at too high a temperature, a resinous product is obtained.

The reaction time varies depending on the reaction temperature and the kind of the polyalkylene polyamine used, but it is generally preferred that the reaction be conducted for 0.5 to 5 hours.

The preparation of an isocyanate-terminated urethane prepolymer is generally conducted in the presence or absence of a solvent.

When an aromatic polyisocyanate is reacted with the polyhydroxyl reactant, the reaction temperature is selected within a range of from 50° to 100° C., and when an aliphatic or alicyclic polyisocyanate is employed, the reaction is conducted at 70° to 130° C.

In the preparation of the urethane prepolymer, it is preferred that the amount of the polyisocyanate be chosen so that all of the hydroxyl groups are completely reacted with isocyanate groups.

More specifically, it is preferred that the ratio of the total number of —NCO groups to the total number of reactive hydrogen atoms (—OH groups) be within a range of from 1.1:1.0 to 5.0:1.0

It is preferred that the reaction between the isocyanate-terminated urethane prepolymer and the chain extender (I) be carried out at −20° to +70° C. under atmospheric pressure in a ketone type solvent.

As the ketone type solvent, there can be used, for example, an aliphatic ketone such as acetone, methylethyl ketone, diethyl ketone, dipropyl ketone, methylisobutyl ketone and methylisopropyl ketone. Use of acetone and methylethyl ketone is preferred.

It is also possible to employ a mixture of such ketone type solvent with benzene, tetrahydrofuran, dioxane, an acetic acid ester, dimethyl formamide or a chlorinated solvent.

The reaction time is determined by the reaction temperature and the reactivity of the polyisocyanate compound. A shorter or longer reaction time can be adopted depending on the reaction conditions. The reaction is continued until absorption at 2250 $cm^{-1}$ based on the group —N=C=O is not observed in the infrared absorption spectrum of the reaction mixture, and in general, this reaction time is 0.5 to 2 hours.

In the reaction between the isocyanate groups of the urethane prepolymer and the chain extender of formula (I), it is critical that the total mole number of the primary and secondary amino groups in the chain extender should exceed the total mole number of the isocyanate groups in the urethane prepolymer. As the total mole number of the amino groups approaches the total mole number of the isocyanate groups, a polyurethane-urea polyamine having a higher molecular weight is formed and the product becomes gelled or has a great tendency toward gelation. In contrast, when the mole number of the amino groups is excessively great, the resulting polyurethane-urea polyamine has a very low molecular weight and if such product is used as an intermediate, it is impossible to obtain a resin having excellent properties. The ratio of the number ($\beta$) of moles of active hydrogen-containing amino groups in the chain extender (I) to the number ($\alpha$) of moles of isocyanate groups in the isocyanate-terminated urethane prepolymer is within the range of $1 < \beta/\alpha \leq 5$, preferably $1 < \beta/\alpha \leq 3$. It is preferred that the molecular weight of the polyurethane-urea polyamine be 5,000 to 100,000.

Although a hydroxyl group capable of reacting with an isocyanate group is present in the chain extender represented by the formula (I), no substantial reaction occurs between the hydroxyl group and the isocyanate group, because the rate of the reaction between the primary or secondary amino group and the isocyanate group is much higher than the rate of the reaction between the hydroxyl group and the isocyanate group, and because the total number of primary and secondary amino groups is in excess in relation to the number of the isocyanate groups. Accordingly, the hydroxyl groups of the chain extender are substantially left in the free or unreacted state bonded to the polyurethane-urea polyamine.

When the thus-prepared polyurethane-urea polyamine is mixed with water or when it is reacted with a cyclic carboxylic acid anhydride and the reaction product is mixed with water, a non-ionic self-emulsifiable emulsion is obtained. The organic solvent used for the reaction can be distilled off under heating. The stability of the emulsion is not reduced by distillation of the solvent. Further, even when the pH of the emulsion is changed within a range of from pH 2 to pH 11 by addition of an acidic or basic substance, the emulsion is quite stable. This is an important characteristic property of a non-ionic emulsion.

Since the polyurethane-urea polyamine to be used as an intermediate for the preparation of the polyurethane emulsion of this invention has a free amino group, the pH of the resulting polyurethane emulsion is higher than 7.

When it is intended to obtain a polyurethane emulsion having a pH lower than 7, the amino group of the resulting polyurethane-urea polyamine is reacted with a cyclic dicarboxylic acid anhydride and the reaction product is mixed with water. More specifically, when the polyurethane-urea polyamine is reacted with a cyclic dicarboxylic acid anhydride in an amount equimolar to the primary of secondary amino groups of the polyurethane-urea polyamine at 5° to 70° C. for 0.5 to 2 hours, a half amide is formed with formation of a carboxyl group.

When a cyclic dicarboxylic acid anhydride is used in this reaction in an amount of at least 50 mole percent based on the sum of the primary and secondary amino groups of the polyurethane-urea polyamine, the pH of the resulting polyurethane emulsion is lower than 7. On the other hand, when less than 50 mole, percent of the cyclic dicarboxylic acid anhydride is reacted, the pH of the resulting polyurethane emulsion is higher than 7.

As is seen from the foregoing description, according to this invention it is possible to obtain a polyurethane emulsion having a selected pH value without addition of a free acid substance or basic substance. In general, in this invention there are obtained emulsions having a pH of 4.0 to 9.0.

As typical examples of the cyclic dicarboxylic acid anhydrides, there can be mentioned maleic anhydride, succinic anhydride, phthalic anhydride, di-, tetra- and hexa-hydrophthalic anhydrides, trimellitic anhydride and itaconic anhydride.

The polyurethane emulsion prepared according to this invention is a so-called self-emulsifiable polyurethane emulsion free of an additive emulsifier. If desired in order to enhance the stability of the emulsion, it is permissible to add a known emulsifier to the polyurethane emulsion of this invention, provided that the properties of the polyurethane resin are not drastically changed.

According to the above-mentioned process of this invention, an emulsion of low viscosity having a resin content of 5 to 50 weight percent is generally obtained. When this emulsion is applied to fibrous materials, non-woven fabrics, paper products, leathers, rubbers, wood articles, metals, glass and plastics by dipping, surface coating or spray drying, the surface feel of these materials will be improved and their properties will be improved by these surface coatings. Further, the polyurethane emulsion can be used as an adhesive or the like in engineering and construction works.

This invention will now be further described in more detail by reference to the following illustrative Examples.

In Examples, all of parts and percent are by weight, unless otherwise indicated.

EXAMPLE 1

103 Parts of diethylene triamine were dissolved in 103 parts of methylethyl ketone, and the solution was charged into a round-bottom flask equipped with a thermometer and an agitator. A solution formed by diluting 46.3 parts of epichlorohydrin with 46.3 parts of methylethyl ketone was added dropwise to the contents of the flask with stirring at 30° to 40° C. over a period of 25 minutes, and a reaction was carried out at 40° C. for 2 hours to obtain a chain extender solution (having a concentration of 50 weight percent).

The chain extender in the solution did not contain an epoxide group, but it contained a covalently bonded chlorine atom.

Separately, 144 parts of dehydrated polytetramethylene ether glycol (hydroxyl value = 54.6), 62 parts of dehydrated polyoxyethylene glycol (hydroxyl value = 54.0), 100 parts of methylethyl ketone and 35 parts of an isomeric mixture of tolylene diisocyanate (2,4-/2,6/2.6- ratio = 80/20) were charged in a round-bottom flask equipped with a thermometer and an agitator, and they were reacted at 80° C. with stirring for 5 hours to obtain a solution of a urethane prepolymer having a remaining isocyanate group content of 2.48 weight percent.

Another flask equipped with a thermometer and an agitator was charged with 4.60 parts of the chain extender solution and 150 parts of acetone, and they were sufficiently mixed. Then, 44.4 parts of the above urethane prepolymer were added dropwise to the contents of the flask at 30° to 33° C. over a period of 15 minutes, and reaction was carried out at 50° C. for 30 minutes to obtain a polymer solution.

A small amount of the polymer solution was sampled and subjected to infrared absorption spectrum analysis. No absorption based on the group -N=C=O was observed at 2250 cm$^{-1}$.

150 Parts of water were added to 90 parts of the thus-obtained polymer solution, and acetone and methylethyl ketone were distilled off under reduced pressure to obtain a milky-white, homogeneous, stable emulsion having a resin content of 15 weight percent and a pH of 8.5.

The thus-obtained emulsion was cast on a Teflon plate and air-dried to obtain a soft rubber-like film. When the film was heat-treated at 120° C. for 20 minutes, a film having the following mechanical properties was obtained.

100% modulus: 9 Kg/cm$^2$
300% modulus: 22 Kg/cm$^2$
tensile strength: 204 Kg/cm$^2$
elongation: 800%

Comparative Example 1—1

1.6 Parts of diethylene triamine were dissolved in 150 parts of acetone and the solution was charged in a flask equipped with a thermometer and an agitator. 44.4 parts of the urethane prepolymer solution obtained in Example 1 were added dropwise to the contents of the flask with stirring at 30° to 33° C. over a period of 15 minutes, and the reaction was carried out at 50° C. for 30 minutes to obtain a polymer solution.

150 Parts of water were added to 90 parts of the thus-formed polymer solution, and acetone and methylethyl ketone were distilled off under reduced pressure to obtain a milky-white emulsion having a resin content of 15 weight percent and a pH of 8.5.

The mechanical properties of a film prepared from this emulsion in the same manner as described in Example 1 were as follows:

100% modulus: 7 Kg/cm$^2$
300% modulus: 18 Kg/cm$^2$
tensile strength: 112 Kg/cm$^2$
elongation: 840%

Comparative Example 1-2

0.62 Part of epichlorohydrin was added to 45 parts of the polymer solution obtained in Comparative Example 1—1, and reaction was carried out with stirring at 50° C. for 1 hour. 70 Parts of water were added to the reaction product, and acetone and methylethyl ketone were distilled off under reduced pressure to obtain a milky-white emulsion having a resin content of 15 weight percent and a pH of 8.5.

A film prepared from this emulsion in the same manner as described in Example 1 had the following mechanical properties:

100% modulus: 8 Kg/cm$^2$
300% modulus: 19 Kg/cm$^2$
tensile strength: 130 Kg/cm$^2$
elongation: 830%

When the results of Example 1 (process of this invention) are compared with the results of Comparative Examples 1—1 and 1-2, it will readily be understood that a film formed from the polyurethane emulsion prepared according to the process of this invention has unexpectedly improved mechanical properties.

EXAMPLE 2

A solution of 1.3 parts of maleic anhydride in 100 parts of methylethyl ketone was added to 90 parts of the polymer solution obtained in Example 1, and reaction was carried out with stirring at 50° C. for 30 minutes. Then, 160 parts of water were added to the reaction mixture, and acetone and methylethyl ketone were distilled off under reduced pressure to obtain a milky-white, homogeneous, stable emulsion having a resin content of 15 percent and a pH of 4.0.

The mechanical properties of a film prepared from this emulsion in the same manner as in Example 1 were as follows:

100% modulus: 11 Kg/cm$^2$
300% modulus: 25 Kg/cm$^2$
tensile strength: 232 Kg/cm$^2$
elongation: 1180%

Comparative Example 2

0.65 part of maleic anhydride dissolved in 50 parts of methylethyl ketone was added to 45 parts of the polymer solution obtained in Comparative Example 1—1, and reaction was carried out with stirring at 50° C. for 30 minutes. Then, 80 parts of water were added to the reaction product, and acetone and methylethyl ketone were distilled off under reduced pressure to obtain a milky-white emulsion having a resin content of 15 weight percent and a pH of 4.0.

The mechanical properties of a film prepared from this emulsion in the same manner as in Example 1 were as follows:

100% modulus: 9 Kg/cm$^2$
300% modulus: 21 Kg/cm$^2$
tensile strength: 118 Kg/cm$^2$
elongation: 1200%

When the results of Example 2 (process of this invention) are compared with the results of Comparative Example 2, it will readily be understood that a film formed from the polyurethane emulsion prepared according to the process of this invention has unexpectedly improved mechanical properties.

EXAMPLE 3

103 Parts of diethylene triamine were dissolved in 103 parts of methylethyl ketone, and the solution was charged in a round-bottom flask equipped with a thermometer and an agitator. A solution formed by diluting 92.5 parts of epichlorohydrin with 92.5 parts of methylethyl ketone was added dropwise to the contents of the flask with stirring at 30° to 45° C. over a period of 40 minutes, and reaction was carried out at 45° C. for 1.5 hours to obtain a chain extender solution.

The chain extender in the solution did not contain an epoxide group but it contained covalently bonded chlorine atoms.

Separately, 711 parts of dehydrated polyoxypropylene glycol (OH value = 157.8), 711 parts of dehydrated polyoxyethylene glycol (OH value = 111.5) and 594 parts of an isomeric mixture of tolylene diisocyanate (2,4- /2,6-ratio = 80/20) were reacted at 90° C. for 3 hours to obtain a urethane prepolymer. As a result of the analysis, it was found that the terminal isocyanate group content was 7.05 percent.

Another flask equipped with a thermometer and an agitator was charged with 38.7 parts of the above chain extender solution and 400 parts of acetone, and a solution formed by dissolving and suspending 100 parts of the above urethane prepolymer in 100 parts of benzene was added dropwise to the contents of the flask at 10° C. over a period of 30 minutes, and reaction was carried out at 50° C. for 30 minutes to obtain a polymer solution.

500 Parts of water were added to the thus-obtained polymer solution, and the solvents used were distilled off under reduced pressure to obtain a homogeneous stable emulsion having a resin content of 20 weight percent. A film prepared from this emulsion of the same manner as in Example 1 had the following mechanical properties:

100% modulus: 9 Kg/cm$^2$
300% modulus: 19 Kg/cm$^2$
tensile strength: 128 Kg/cm$^2$
elongation: 880%

EXAMPLE 4

1029 Parts of poly(1,4-butylene adipate) glycol (OH value = 109.0), 686 parts of polyoxyethylene glycol (OH value = 55.2), 1022 parts of benzene and 669 parts of diphenylmethane-4,4'-diisocyanate were reacted at 80° C. for 1.5 hours to obtain a solution of a urethane prepolymer having a residual isocyanate group content of 3.27 percent.

200 Parts of the thus-formed urethane prepolymer solution were added dropwise under agitation at 5° C. over a period of 30 minutes to a solution formed by diluting 35.8 parts of the chain extender solution obtained in Example 3 with 400 parts of methylethyl ketone, and reaction was carried out at 50° C. for 30 minutes to obtain a polymer solution.

670 Parts of water were added to this polymer solution, and they were sufficiently mixed. Then, benzene and methylethyl ketone were distilled off under reduced pressure to obtain a homogeneous stable emulsion having a resin content of 20 percent.

A film prepared from this emulsion in the same manner as in Example 1 had the following mechanical properties:

100% modulus: 15 Kg/cm$^2$
300% modulus: 34 Kg/cm$^2$
tensile strength: 156 Kg/cm$^2$
elongation: 800%

EXAMPLE 5

982 Parts of polytetramethylene ether glycol (OH value = 114.2), 421 parts of polyoxyethylene glycol (OH value —111.5) and 476 parts of 1,6-hexamethylene diisocyanate were reacted at 100° C. for 3 hours to obtain a urethane prepolymer. As a result of the analysis of this prepolymer, it was found that the residual isocyanate group content was 6.31 percent.

Separately, a solution formed by diluting 46.2 parts of epichlorohydrin with 46.2 parts of methylethyl ketone was added to a 50 percent methylethyl ketone solution of 60 parts of ethylene diamine, and they were reacted in the same manner as in Example 1 to obtain a chain extender solution.

32.2 Parts of the thus-obtained chain extender solution diluted with 400 parts of methylethyl ketone were charged in a flask equipped with a thermometer and an agitator, and a solution formed by dissolving 100 parts of the above prepolymer solution in 100 parts of methylethylketone was added dropwise to the contents of the flask with stirring at 20° C. over a period of 20 minutes, and reaction was carried out at 50° C. for 30 minutes to obtain a polymer solution.

Then, 500 parts of water were added to this polymer solution and they were sufficiently mixed. Methylethyl ketone was distilled off under reduced pressure to obtain a homogeneous stable emulsion.

A film prepared from this emulsion in the same manner as in Example 1 had the following mechanical properties:

100% modulus: 12 Kg/cm$^2$
300% modulus: 27 Kg/cm$^2$
tensile strength: 152 Kg/cm$^2$
elongation: 1020%

The embodiments of the invention in which an exclusive property or privilege is claimed are defined as follows:

1. A method for preparing a polyurethane aqueous emulsion in which the polyurethane component is a polyurethane-urea-polyamine containing in the molecule a cross-linkable halohydrin structure, which comprises:
   1. reacting (I) organic polyhydroxyl reactant mixture consisting essentially of 15 to 80 weight percent of a watersoluble polyoxyethylene glycol having a molecular weight of 200 to 10,000, and the balance a water-insoluble organic polyhydroxyl compound having a molecular weight of 200 to 10,000 and (II) an excess of organic polyisocyanate to produce an isocyanateterminated prepolymer, and
   2. reacting said prepolymer with (III) polyalkylene polyamine having at least two groups selected from the group consisting of primary amino groups and secondary amino groups and also having a functional group of the formula

—CH(OH)CH$_2$X where X is chloro or bromo, the total mole number of primary and secondary amino groups in the polyalkylene polyamine being greater than the total mole number of isocyanate groups in said prepolymer, the reaction being carried out until the presence of —NCO groups cannot be detected, whereby to form polyurethane-urea-polyamine,
   3. reacting the polyurethane-urea-polyamine with a cyclic dicarboxylic acid anhydride, and
   4. mixing the reaction product of step 4 with water to form a polyurethane emulsion.

2. A method in accordance with claim 1 wherein said polyalkylene polyamine (III) has the formula

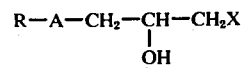

wherein X is a member of the group consisting of Cl and Br, A is a member of the group consisting of a secondary amino group and a tertiary amino group, and R is an alkylene radical having at least one of a member of the group consisting of a primary amino group and a secondary amino group, with the proviso that said polyalkylene polyamino contains at least two of a member of the group consisting of a primary amino group and a secondary amino group.

3. A method in accordance with claim 2 wherein the reaction of said prepolymer with III as carried out in the liquid phase in a ketone solvent, at a temperature of from −20° to +70° C.

4. A process according to claim 2, in which said polyalkylene polyamine is prepared by reacting, at from 10° to 80° C., for from 0.5 to 5 hours, epichlorohydrin or epibromohydrin with a polyamine having the formula

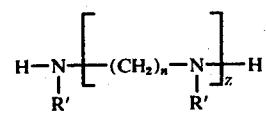

wherein n in an integer larger than one, Z is an integer of 2 to 4, and R' is hydrogen, alkyl having one to 4 carbon atoms or hydroxyalkyl having one to 4 carbon atoms.

5. A process according to claim 1, in which reactant XXI contains up to 50 percent, by molecular equivalent, of a substance selected from the group consisting of diamines, substitution product of a diamine with an alkyl group having one to 22 carbon atoms, alkylene oxide adducts of diamines, acrylonitrile adducts of diamines and acrylate adducts of diamines.

6. A process according to claim 1 in which the ratio of ($\beta$) the total mole number of amino groups containing active hydrogen atoms in said polyalkylene polyamine, to ($\alpha$) the total mole number of isocyanate groups in said prepolymer is in the range of $1 < \beta/\alpha \leq 5$.

7. A method according to claim 1 in which in step 3, the amount of said cyclic dicarboxylic acid anhydride is at least 50 mole percent based on the sum of the primary and secondary amino groups of the polyurethane-urea-polyamine, whereby the resulting polyurethane emulsion has a pH lower than 7.

8. A method according to claim 1 in which said cyclic dicarboxylic anhydride is selected from the group consisting of maleic anhydride, succinic anhydride, phthalic anhydride, di-, tetra- and hexa-hydrophthalic anhydrides, trimellitic anhydride and itaconic anhydride.

9. An aqueous polyurethane emulsion prepared by the process of claim 1.

10. A polyurethane molded product prepared by forming the emulsion of claim 9 into a molded product and then heat treating the product to effect cross-linking.

* * * * *

UNITED STATES PATENT AND TRADEMARK OFFICE
CERTIFICATE OF CORRECTION

PATENT NO. : 4 012 349
DATED : March 15, 1977
INVENTOR(S) : Kazuo Matsuda, Hidemasa Ohmura and Hirakazu Aritaki It is certified that error appears in the above-identified patent and that said Letters Patent are hereby corrected as shown below:

Column 11, line 47;   change "isocyanate terminated" to ---isocyanate-terminated---.

Column 12, line 13;   change "polyamino" to ---polyamine---.

Column 12, line 39;   change "XXI" to ---III---.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*